United States Patent
Inagaki

(10) Patent No.: US 8,493,283 B2
(45) Date of Patent: Jul. 23, 2013

(54) IMAGE TRANSMISSION APPARATUS AND CONTROL METHOD THEREFOR, AND IMAGE DISPLAY SYSTEM

(75) Inventor: Kensuke Inagaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 13/173,101

(22) Filed: Jun. 30, 2011

(65) Prior Publication Data
US 2012/0019433 A1   Jan. 26, 2012

(30) Foreign Application Priority Data

Jul. 21, 2010   (JP) .................................. 2010-164351

(51) Int. Cl.
*G09G 5/00*   (2006.01)

(52) U.S. Cl.
USPC ......................................................... 345/1.1

(58) Field of Classification Search
USPC ........ 345/1.1, 1.2, 2.1, 2.2, 3.1–3.3; 709/203, 709/217
See application file for complete search history.

(56) References Cited

U.S. PATENT DOCUMENTS

| | | | | |
|---|---|---|---|---|
| 5,767,897 A * | 6/1998 | Howell | ...................... | 348/14.07 |
| 6,728,753 B1 * | 4/2004 | Parasnis et al. | ............... | 709/203 |
| 7,904,513 B2 * | 3/2011 | Kanda et al. | .................. | 709/204 |
| 8,285,783 B2 * | 10/2012 | Otobe | .......................... | 709/204 |
| 2006/0072910 A1 * | 4/2006 | Kato | ............................ | 386/131 |
| 2007/0159498 A1 * | 7/2007 | Yang et al. | .................... | 345/660 |
| 2008/0094421 A1 * | 4/2008 | Maeda | ......................... | 345/661 |
| 2008/0232702 A1 * | 9/2008 | Kimoto | ........................ | 382/232 |
| 2011/0109647 A1 * | 5/2011 | Miyazawa et al. | ............ | 345/620 |
| 2011/0280543 A1 * | 11/2011 | Uchida et al. | ................. | 386/230 |

FOREIGN PATENT DOCUMENTS

JP   2006-106158   4/2006

* cited by examiner

*Primary Examiner* — Joe H Cheng

(74) *Attorney, Agent, or Firm* — Cowan, Liebowitz & Latman, P.C.; Mark Montague, Esq.

(57) ABSTRACT

An image of an area smaller than the number of horizontal pixels and the number of vertical pixels of an external image display apparatus is extracted from a display area if the number of horizontal pixels of a part of a display area designated by a designation unit is greater than the number of horizontal pixels of the external image display apparatus acquired by an acquisition unit and/or if the number of vertical pixels of the part of the display area designated by the designation unit is greater than the number of vertical pixels of the external image display apparatus acquired by the acquisition unit.

13 Claims, 14 Drawing Sheets

IMAGE TRANSMISSION APPARATUS AND CONTROL METHOD THEREFOR, AND IMAGE DISPLAY SYSTEM

BACKGROUND OF THE INVENTION

1. Field of the Invention

The present invention relates to an image transmission apparatus and control method therefore, and an image display system.

2. Description of the Related Art

In recent years, there have been more opportunities to use a projector that projects onto a screen an image based on an image signal received from a PC during a presentation at a conference, a workshop, and the like.

In general, the PC and the projector transmit and receive the image signal through an image cable. However, there are problems, such as the connection is troublesome, the connection from a remote place is difficult, and there is a limitation in the number of PCs that can be connected at the same time. Therefore, an image transfer system that connects the PC and the projector through a network has been drawing attention in recent years.

Conventionally, an image processing apparatus such as a PC captures a specific window or an image of the whole screen, and image data obtained by the capture is transmitted to a display apparatus such as a projector to realize the image transfer system.

Conventionally, if the number of display pixels of the PC and the number of display pixels of the display apparatus, such as the projector, are different in the image transfer system, an image resolution converter is arranged on the display apparatus to convert the resolution of the image. If the number of display pixels of the PC is greater than that of the display apparatus, there is a problem that the image data is transmitted to the display apparatus without change, and an unnecessary load is imposed on the network.

To solve the problems, Japanese Patent Laid-Open No. 2006-106158 discloses, for example, a method in which the resolution of image data is converted in advance within the PC so that the number of display pixels of the PC matches that of the display apparatus, and then the image data is transmitted.

However, in the configuration described in Japanese Patent Laid-Open No. 2006-106158, when the resolutions between the PC and the display apparatus differ, there is a problem that it is necessary to perform the resolution conversion processing within the PC and the PC should take a considerable load of the resolution conversion processing. Furthermore, there is a problem that the image is deteriorated by reduction processing of the image because the image needs to be reduced when the number of display pixels of the PC is greater than the number of display pixels of the display apparatus.

SUMMARY OF THE INVENTION

The present invention has been made in view of the problems, and reduces the load of image transfer processing and prevents deterioration of an image by image reduction processing in a system including an information processing apparatus that transmits the image and a display apparatus that displays the transmitted image.

According to an aspect of the present invention, there is provided an image transmission apparatus that transmits an image to an external image display apparatus through a communication unit, the image transmission apparatus comprising: a display unit; a designation unit that designates a part of a display area of the display unit; an acquisition unit that acquires a number of horizontal pixels and a number of vertical pixels of the external image display apparatus through the communication unit; an extraction unit that extracts an image of the part of the display area designated by the designation unit if a number of horizontal pixels and a number of vertical pixels of the part of the display area designated by the designation unit are smaller than the number of horizontal pixels and the number of vertical pixels of the external image display apparatus acquired by the acquisition unit, and that extracts an image of an area smaller than the number of horizontal pixels and the number of vertical pixels of the external image display apparatus from the display area if at least one case among a case in which the number of horizontal pixels of the part of the display area designated by the designation unit is equal to or greater than the number of horizontal pixels of the external image display apparatus acquired by the acquisition unit and a case in which the number of vertical pixels of the part of the display area designated by the designation unit is equal to or greater than the number of vertical pixels of the external image display apparatus acquired by the acquisition unit is true; and a transmission unit that transmits the image extracted by the extraction unit to the external image display apparatus.

According to another aspect of the present invention, there is provided an image transmission apparatus that transmits an image to an external image display apparatus through a communication unit, the image transmission apparatus comprising: a display unit; a designation unit that designates a part of a display area of the display unit; a number of pixels acquisition unit that acquires a number of horizontal pixels and a number of vertical pixels of the external image display apparatus through the communication unit; an extraction unit that extracts an image of the part of the display area designated by the designation unit; a transmission unit that transmits the image extracted by the extraction unit to the external image display apparatus; and a control unit that changes the area designated by the designation unit to an area smaller than the number of horizontal pixels and the number of vertical pixels of the external image display apparatus if at least one case among a case in which a number of horizontal pixels of part of the display area designated by the designation unit is greater than the number of horizontal pixels of the external image display apparatus acquired by the number of pixels acquisition unit and a case in which a number of vertical pixels of the part of the display area designated by the designation unit is greater than the number of vertical pixels of the external image display apparatus acquired by the number of pixels acquisition unit is true.

According to still another aspect of the present invention, there is provided an image display system comprising an image display apparatus and an image transmission apparatus, the image display apparatus comprising: a first reception unit that receives an image transmitted from the image transmission apparatus; a first display unit that displays the image received by the first reception unit; an acquisition unit that acquires a number of horizontal pixels and a number of vertical pixels of a display area of the first display unit; and a first transmission unit that transmits the number of horizontal pixels and the number of vertical pixels of the display area of the first display unit acquired by the acquisition unit to the image transmission apparatus, the image transmission apparatus comprising: a second display unit; a designation unit that designates a part of a display area of the second display unit; a second reception unit that receives the number of horizontal pixels and the number of vertical pixels of the image display apparatus through the communication unit; an extraction unit that extracts an image of the part of the display area designated by the designation unit if a number of horizontal pixels and a number of vertical pixels of the part of the display area designated by the designation unit are smaller than the number of horizontal pixels and the number of vertical pixels of the display area of the first display unit received by the second reception unit, and that extracts an image of an area smaller than the number of horizontal pixels and the number of vertical pixels of the display area of the first display unit from a display area of the second display unit if at least one case among a case in which the number of horizontal pixels of the part of the display area designated by the designation unit is equal to or greater than the number of horizontal pixels of the display area of the first display unit received by the second reception unit and a case in which the number of vertical pixels of the part of the display area designated by the designation unit is equal to or greater than the number of vertical pixels of the display area of the first display unit received by the second reception unit is true; and a second transmission unit that transmits the image extracted by the extraction unit to the image display apparatus.

According to yet another aspect of the present invention, there is provided an image display system comprising an image display apparatus and an image transmission apparatus, the image display apparatus comprising: a first reception unit that receives an image transmitted from the image transmission apparatus; a first display unit that displays the image received by the first reception unit; an acquisition unit that acquires a number of horizontal pixels and a number of vertical pixels of a display area of the first display unit; and a first transmission unit that transmits the number of horizontal pixels and the number of vertical pixels of the display area of the first display unit acquired by the acquisition unit to the image transmission apparatus, the image transmission apparatus comprising: a second display unit; a designation unit that designates a part of a display area of the second display unit; a second reception unit that receives the number of horizontal pixels and the number of vertical pixels of the image display apparatus through the communication unit; an extraction unit that extracts an image of the part of the display area designated by the designation unit; a second transmission unit that transmits the image extracted by the extraction unit to the image display apparatus; and a control unit that changes the area designated by the designation unit to an area smaller than the number of horizontal pixels and the number of vertical pixels of the display area of the first display unit if at least one case among a case in which a number of horizontal pixels of the part of the display area designated by the designation unit is greater than the number of horizontal pixels of the display area of the first display unit received by the second reception unit and a case in which a number of vertical pixels of the part of the display area designated by the designation unit is greater than the number of vertical pixels of the display area of the first display unit received by the second reception unit is true.

According to still yet another aspect of the present invention, there is provided a control method of an image transmission apparatus that transmits an image to an external image display apparatus through a communication unit and that comprises a display unit, the control method comprising: a designation step of designating a part of a display area of the display unit; an acquisition step of acquiring a number of horizontal pixels and a number of vertical pixels of the external image display apparatus through the communication unit; an extraction step of extracting an image of the part of the display area designated in the designation step if a number of horizontal pixels and a number of vertical pixels of the part of the display area designated in the designation step are smaller than the number of horizontal pixels and the number of vertical pixels of the external image display apparatus acquired in the acquisition step, and extracting an image of an area smaller than the number of horizontal pixels and the number of vertical pixels of the external image display apparatus from the display area if at least one case among a case in which the number of horizontal pixels of the part of the display area designated in the designation step is equal to or greater than the number of horizontal pixels of the external image display apparatus acquired in the acquisition step and a case in which the number of vertical pixels of the part of the display area designated in the designation step is equal to or greater than the number of vertical pixels of the external image display apparatus acquired in the acquisition step is true; and a transmission step of transmitting the image extracted in the extraction step to the external image display apparatus.

According to yet still another aspect of the present invention, there is provided a control method of an image transmission apparatus that transmits an image to an external image display apparatus through a communication unit and that comprises a display unit, the control method comprising: a designation step of designating a part of a display area of the display unit; a number of pixels acquisition step of acquiring a number of horizontal pixels and a number of vertical pixels of the external image display apparatus through the communication unit; an extraction step of extracting an image of the part of the display area designated in the designation step; a transmission step of transmitting the image extracted in the extraction step to the external image display apparatus; and a control step of changing the area designated in the designation step to an area smaller than the number of horizontal pixels and the number of vertical pixels of the external image display apparatus if at least one case among a case in which a number of horizontal pixels of the part of the display area designated in the designation step is greater than the number of horizontal pixels of the external image display apparatus acquired in the number of pixels acquisition step and a case in which a number of vertical pixels of the part of the display area designated in the designation step is greater than the number of vertical pixels of the external image display apparatus acquired in the number of pixels acquisition step is true.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

First Embodiment

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
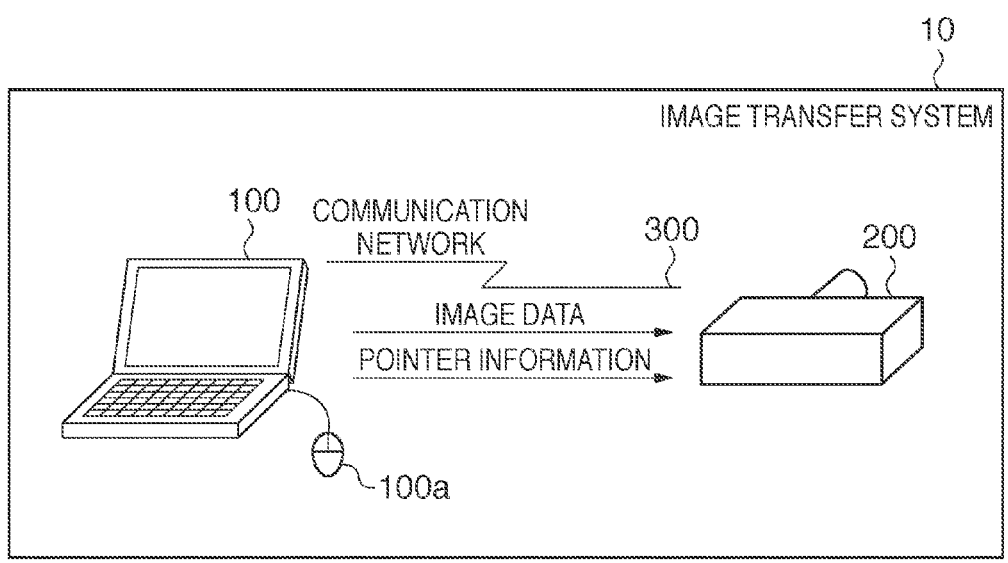
FIG. 1 is a schematic diagram of an image transfer system according to embodiments of the present invention.

FIG. 1 is a diagram showing the configuration of an image transfer system 10 using an image processing apparatus according to embodiments of the present invention. An image transfer system 10 includes a PC 100 (image processing apparatus) and a projector 200 (display apparatus), and the PC 100 and the projector 200 form a communication network 300 through a LAN. The PC 100 includes a window system. The window system herein denotes a mechanism for allocating specific areas to a plurality of tasks to multiplex the screen output. An example of the window system includes Graphical User Interface (GUI) realized by Windows (registered trademark) which is an Operating System (OS) of Microsoft.

In the image transfer system 10, the PC 100 captures an image displayed on a display and transmits image data obtained by the capture to the projector 200 through the communication network 300. The projector 200 receives the image data transmitted from the PC 100, converts the image data into a format that can be outputted, and displays the image. At this point, a pointer on the window system in the PC 100 is operated by a mouse 100a, and position information of the pointer is transmitted to the projector 200 separately from the image data.

Figure 2:
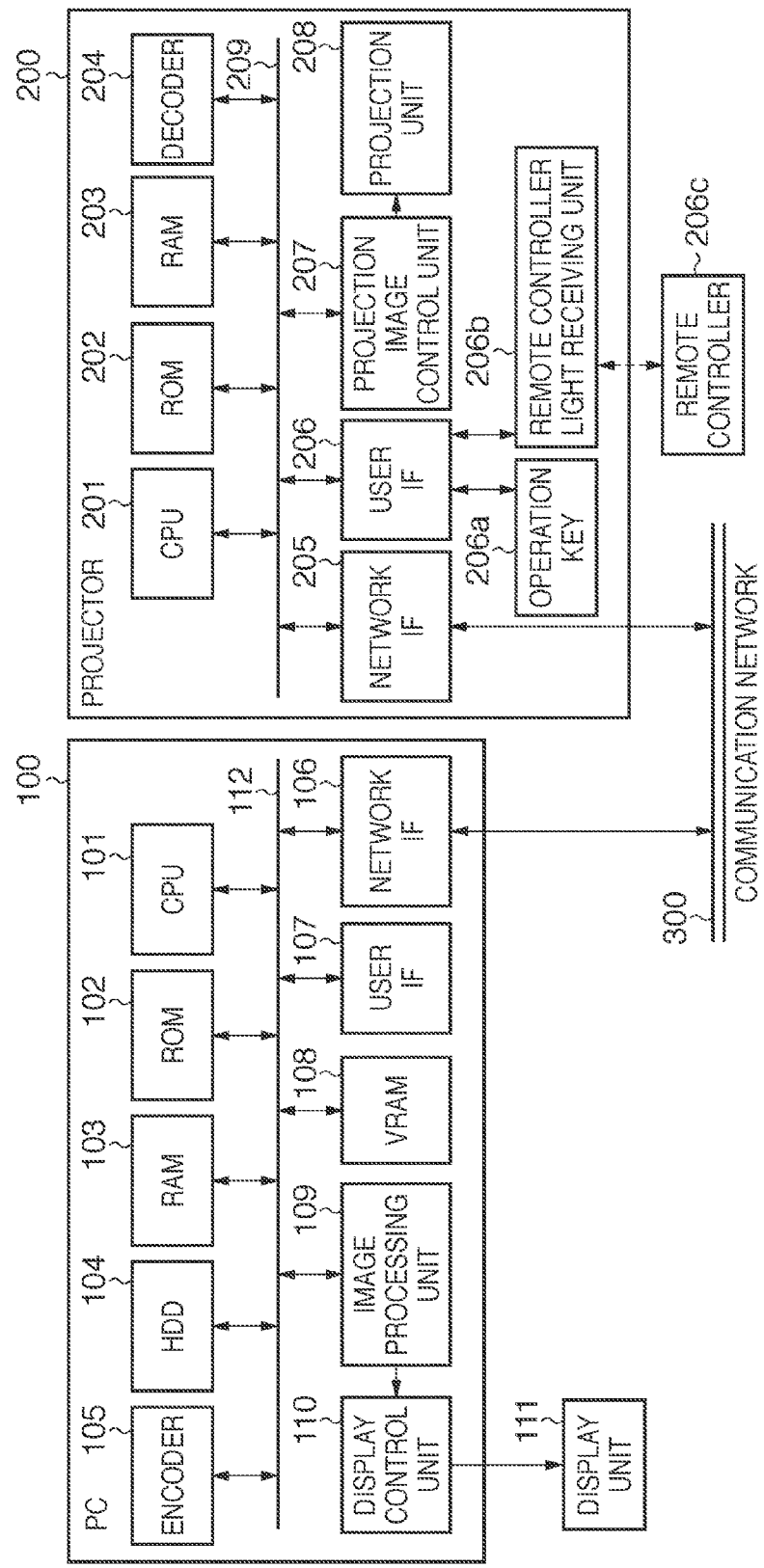
FIG. 2 is a block diagram showing configurations of a PC and a projector that constitute the image transfer system of FIG. 1.

FIG. 2 is a block diagram showing configurations of the PC 100 and the projector 200 shown in FIG. 1.

A CPU 101 controls the entire PC 100. A ROM 102 stores control programs describing processing procedures of the CPU 101. A RAM 103 serves as a work memory to temporarily store control programs and data. A hard disk drive (HDD) 104 stores programs and data of applications, OSs, and the like. An encoder 105 compresses image data. A network IF 106 is an interface for communication with the projector 200, a server, and the like through a LAN and the like. A user IF 107 processes user input from a keyboard and a point device (such as a mouse). A VRAM 108 stores image data displayed in the PC. An image processing unit 109 processes image data received from the VRAM 108. A display control unit 110 controls a display unit 111 based on image data received from the image processing unit 109. The PC 100 includes an internal bus 112 for connecting these elements.

A CPU 201 controls the entire projector 200. A ROM 202 stores control programs describing processing procedures of the CPU 201. A RAM 203 serves as a work memory to temporarily store control programs and data. A decoder 204 decodes data compressed by a predetermined compression method. A network IF 205 is an interface for connection with the PC 100 through a network. A user IF 206 receives user input from a remote controller 206c through an operation key 206a or a remote controller light receiving unit 206b. A projection image control unit 207 outputs an image. A projection unit 208 includes a liquid crystal panel that projects an input image, a drive of the liquid crystal panel, a lens, a drive system of the lens, and a light source. The projector 200 includes an internal bus 209 for connecting these elements.

An operation according to the first embodiment of the image communication system configured as described above will be described with reference to FIGS. 3 to 8.

Figure 3:
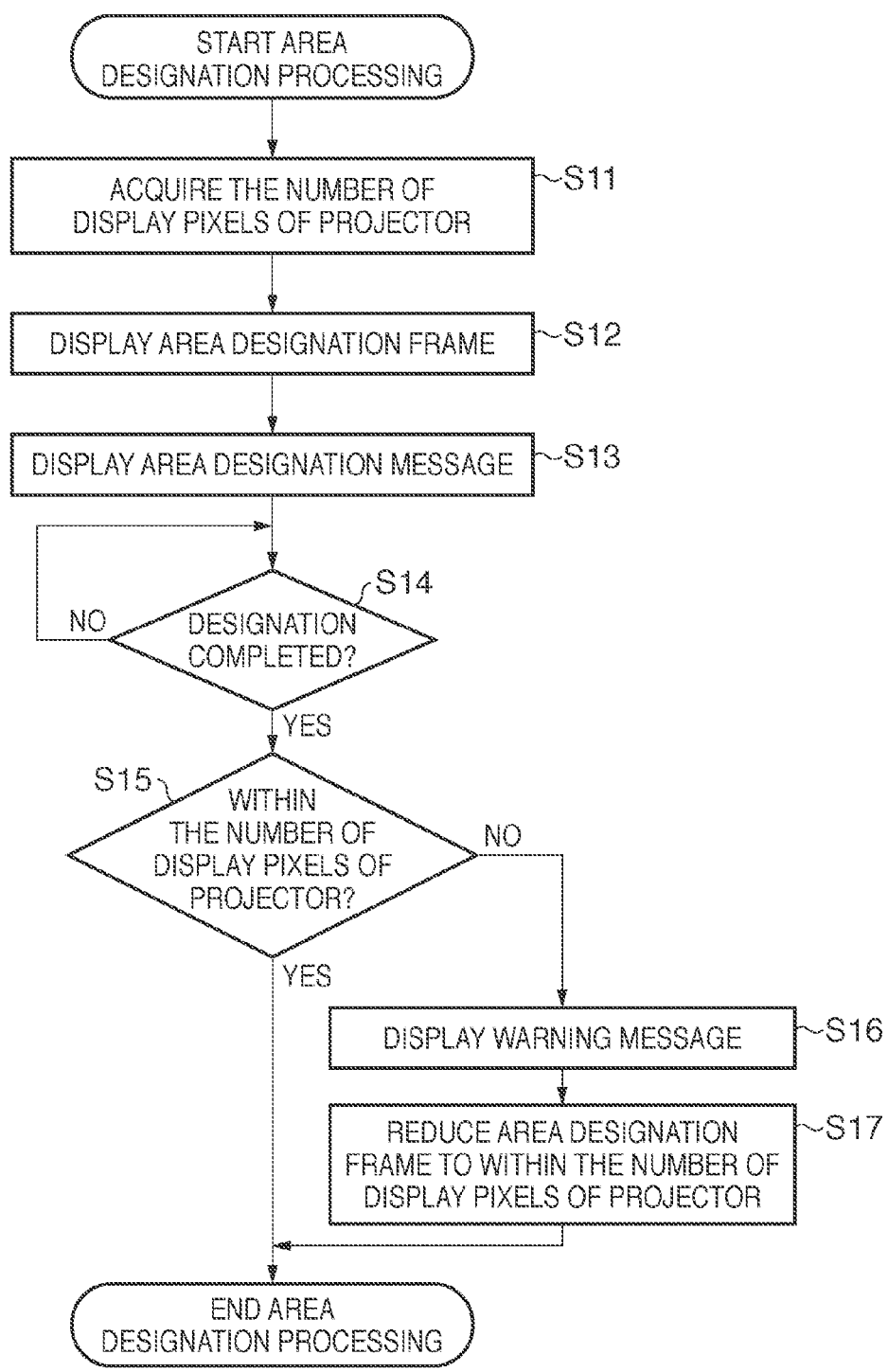
FIG. 3 is a flow chart of area designation processing in the PC according to a first embodiment.

Based on a command from the CPU 101, the PC 100 reads an image transfer program from the HDD 104 to expand the program in the RAM 103 and starts area designation processing shown in FIG. 3. More specifically, the CPU 101 executes the flow chart of FIG. 3 by controlling the blocks of the PC 100 based on the program expanded in the RAM 103. A flow of the area designation processing will be described with reference to the flow chart of FIG. 3.

When the area designation processing is started, the number of pixels of a display area of the projector 200 (hereinafter, called "number of display pixels") is acquired through the network IF 106 (step S11). In response to an inquiry of the number of display pixels from the PC 100, the CPU 201 of the projector 200 reads out the number of display pixels of the projector 200 stored in advance in the ROM 202 and transmits the number of display pixels to the PC 100 through the network IF 205.

The CPU 101 causes the display unit 111 to display an area designation frame for designating at least part of the area for capturing an image (step S12) and causes the display unit 111 to display a message for promoting area designation (step S13). The CPU 101 then waits until the user completes the area designation (step S14).

Figure 4A:
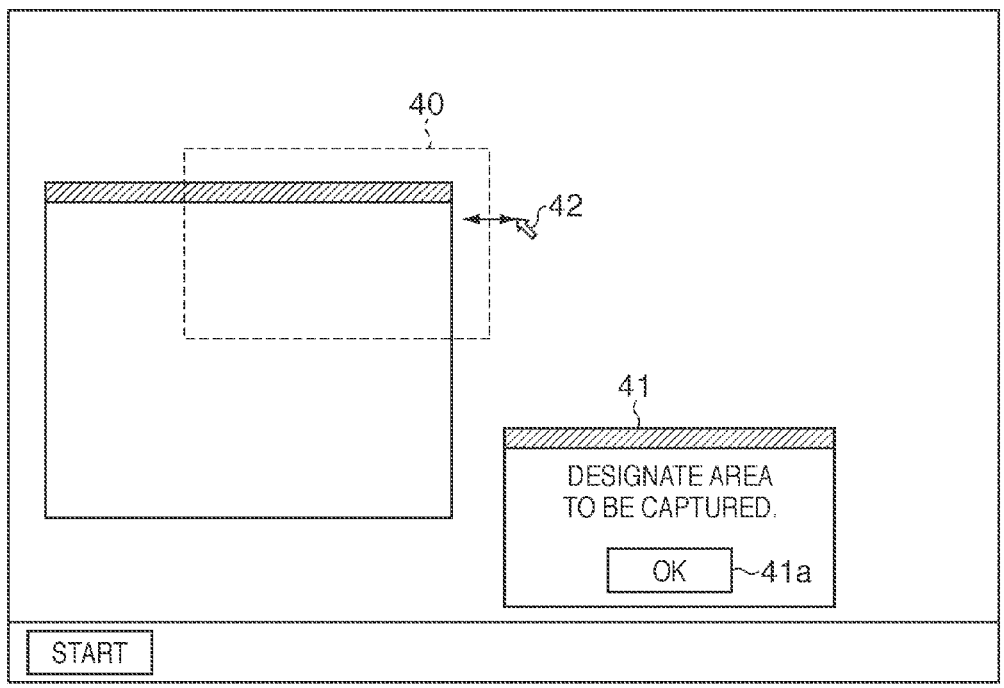
FIGS. 4A and 4B are diagrams showing examples of GUIs for setting an area designation frame according to the first embodiment.

FIG. 4A shows the execution of the process of steps S12 to S14 on the display unit 111 of the PC 100. An area designation frame 40 is displayed in step S12, and then an area designation message window 41 is displayed in step S13. The user uses the mouse pointer 42 to designate an arbitrary size of the area designation frame and presses an OK button 41a of the area designation message window 41 (step S14) to determine the position and the size of the area designation frame.

Figure 4B:
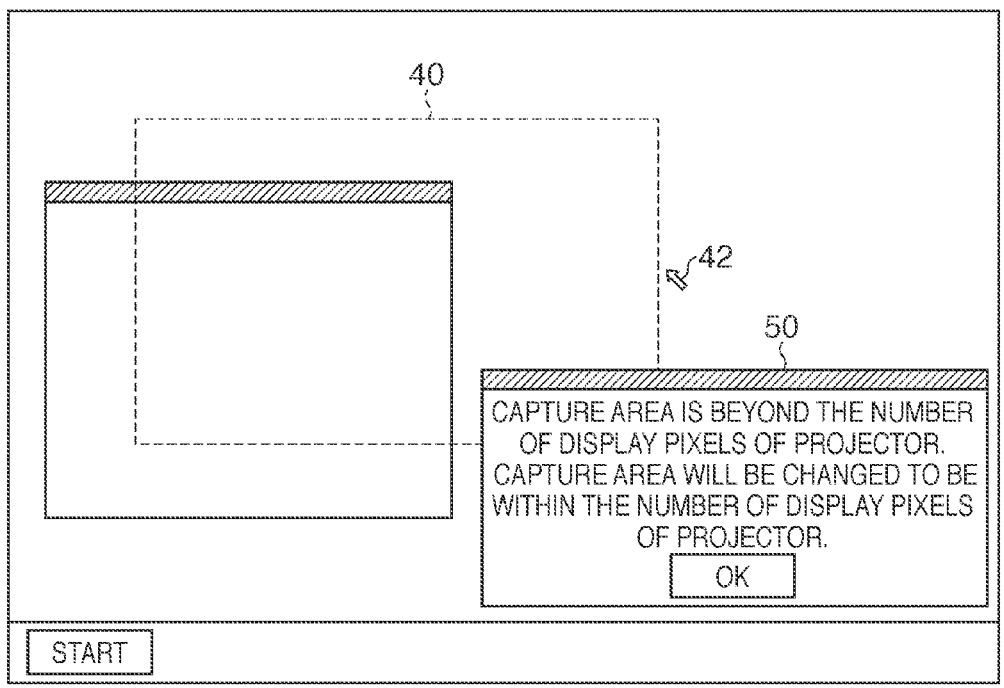

When the user determines the size of the area designation frame, the CPU 101 determines whether the size of the area designation frame is within the acquired number of display pixels of the projector 200 (step S15). In this case, the number of horizontal pixels and the number of vertical pixels of the area designation frame are compared to the number of horizontal pixels and the number of vertical pixels of the projector 200, respectively. If one or both of the numbers are greater than the number of horizontal pixels and the number of vertical pixels of the projector 200, a warning window 50 as shown in FIG. 4B is displayed to display a warning to the user (step S16). The area designation frame is then changed to a size equal to or smaller than the number of display pixels of the projector 200 (step S17), and the area designation processing ends. On the other hand, if it is determined that the size of the area designation frame is within the number of display pixels of the projector 200 in step S15, the area designation processing ends. Although an example of displaying the area designation frame is described in the present embodiment, a method of changing the color of the designated area or other methods for designating the area may be used instead of the frame.

Figure 5A:
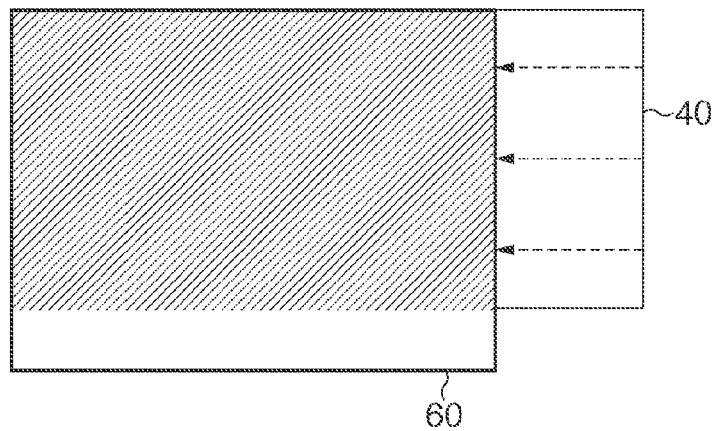
FIGS. 5A to 5C are diagrams showing reduction processing of the area designation frame according to the first embodiment.
Figure 5B:
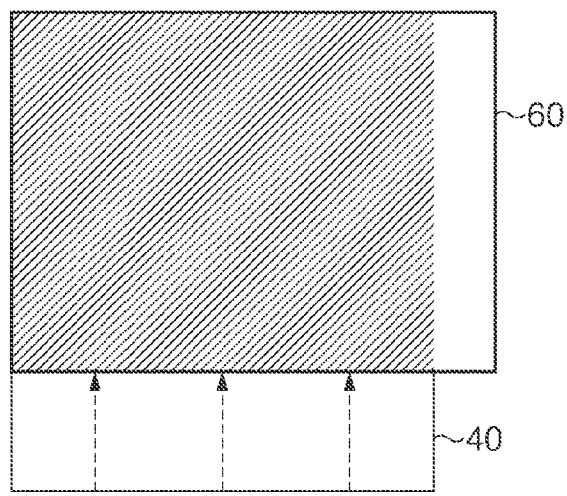
Figure 5C:
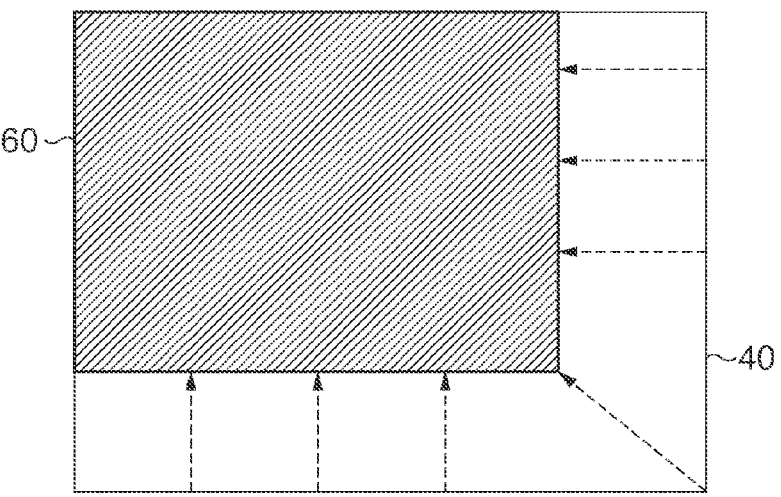

FIGS. 5A to 5C show reduction processing of the size of the area designation frame executed in step S17. In FIGS. 5A to 5C, a rectangle 60 indicated by bold lines denotes the number of display pixels of the projector, and a frame indicated by solid lines denotes the area designation frame 40. FIG. 5A shows a case in which the number of horizontal pixels of the area designation frame 40 is greater than the number of display pixels of the projector. In this case, the CPU 101 reduces the number of horizontal pixels of the area designation frame 40 to within a range equal to or smaller than the number of horizontal pixels of the projector (rectangle 60). An area illustrated by oblique lines indicates the size of the area designation frame 40 after the reduction. FIG. 5B shows a case in which the number of vertical pixels of the area designation frame 40 is greater than the number of display pixels of the projector. In this case, the CPU 101 reduces the number of vertical pixels of the area designation frame 40 to within the range equal to or smaller than the number of vertical pixels of the projector (rectangle 60). An area illustrated by oblique lines indicates the size of the area designation frame 40 after the reduction. FIG. 5C shows a case in which the number of horizontal pixels and the number of vertical pixels of the area designation frame 40 are greater than the number of display pixels of the projector. In this case, the CPU 101 reduces the number of horizontal pixels and the number of vertical pixels of the area designation frame 40 to within the range equal to or smaller than the number of horizontal pixels and the number of vertical pixels of the projector (rectangle 60). An area illustrated by oblique lines that is equal to the number of display pixels of the projector (rectangle 60) indicates the size of the area designation frame 40 after the reduction. FIGS. 5A to 5C show an example in which the number of horizontal pixels and the number of vertical pixels from the upper left corner of the area designation frame 40 are changed to be within the range of the number of display pixels of the projector. In other examples, the reduction may be based on another corner of the area designation frame 40, or the area designation frame may be narrowed down by the same number of pixels vertically and horizontally based on the center of the area designation frame 40. Therefore, any method can be used as long as the number of horizontal pixels and the number of vertical pixels of the area designation frame 40 are reduced to within the range of the number of display pixels of the projector (rectangle 60).

Figure 6:
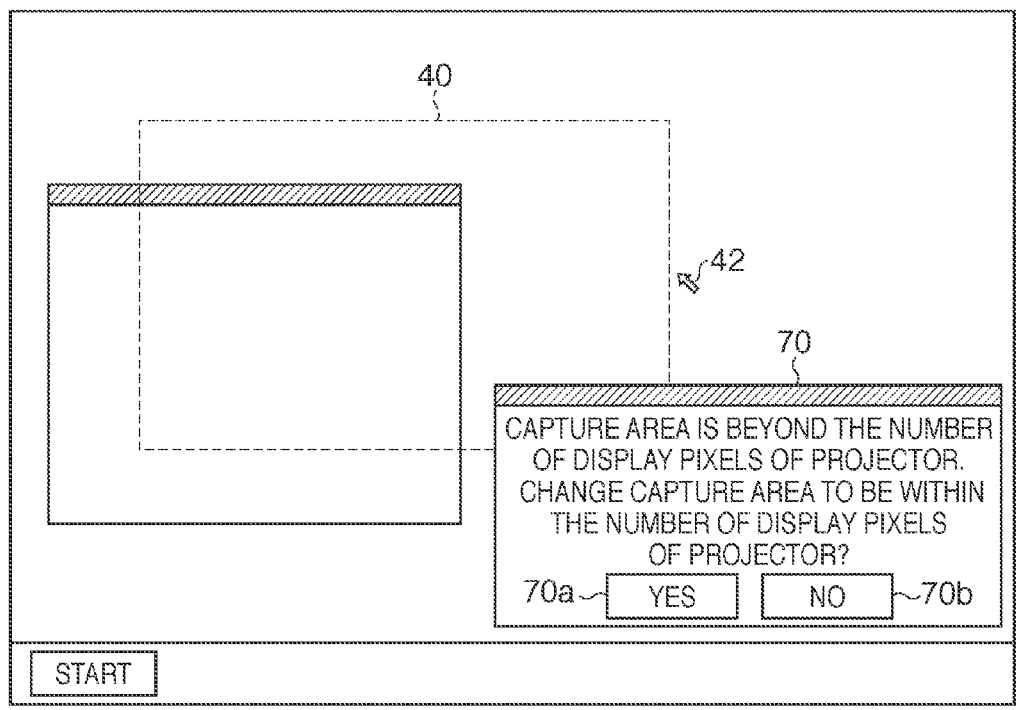
FIG. 6 is a diagram showing an example of warning display according to the first embodiment.

Instead of displaying the warning window 50 in FIG. 4B, a warning window 70 as shown in FIG. 6 may be displayed to allow the user to select a "Yes" button 70a or a "No" button 70b. If the user presses the "No" button 70b in the warning window 70, the area designation frame 40 is beyond the resolution of the projector 200. Therefore, the reduction processing of the image is necessary in the PC 100 or the projector 200. As a result, the load associated with the reduction processing of the image increases, and the image is deteriorated.

In the first embodiment, the area designation frame 40 is changed to be within the number of display pixels of the projector in step S17. Meanwhile, the process may be carried out so that the area designation frame 40 cannot be enlarged to be greater than the number of display pixels of the projector 200 when the user uses the mouse pointer to change the size of the area designation frame 40.

Figure 7:
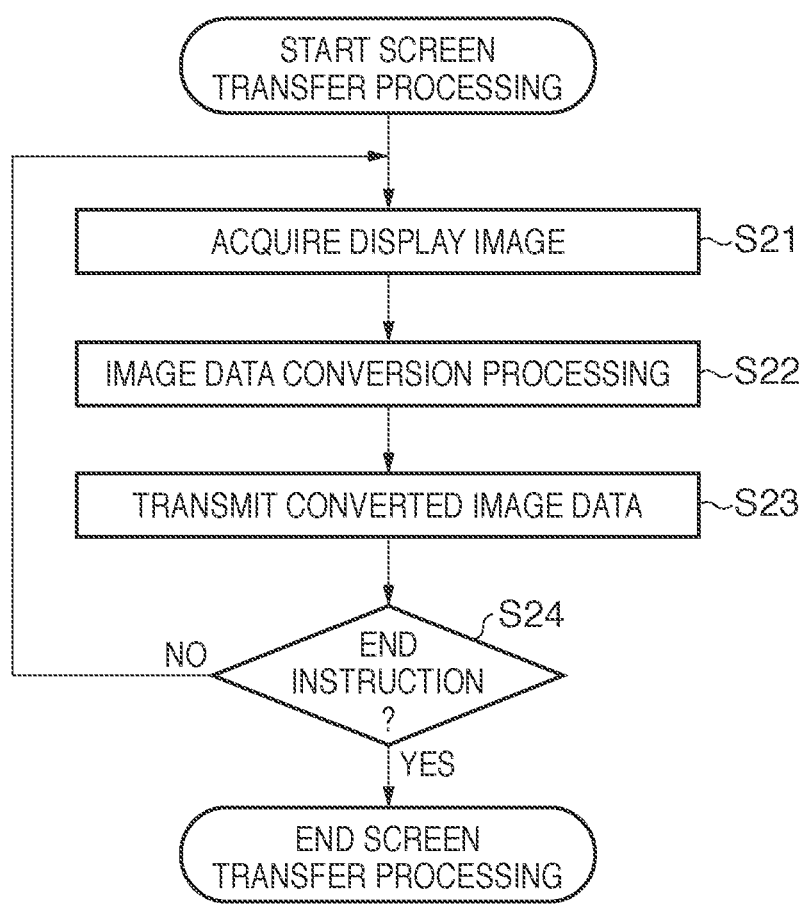
FIG. 7 is a flow chart of image transfer processing according to the first embodiment.

Screen transfer processing shown in FIG. 7 is started when the area designation processing is finished as described above. The screen transfer processing will be described with reference to FIG. 7. As described above, the CPU 101 controls the components of the PC 100 to execute the operation of the flow chart of FIG. 7 based on an application expanded in the RAM 103 of the PC 100.

When the screen transfer processing is started, the CPU 101 executes the following operation every time the network IF 106 receives an image request signal transmitted from the projector 200. The CPU 101 captures an image outputted to the display unit 111 and stores image data of the captured image in the RAM 103 from the VRAM 108 through the driver (step S21). In this case, the CPU 101 acquires only the image data of the area designated in the area designation processing and stores the image data in the RAM 103 (image acquisition).

The CPU 101 uses the encoder 105 to convert the image data stored in the RAM 103 into a predetermined data format (step S22). Examples of the conversion into a predetermined data format include JPEG compression and run-length compression. Since the image data is generally enormous, the bandwidth of the network is pressured if the acquired image data is transferred without change. Therefore, the image is converted in step S22 to compress the image. If the PC 100 does not include the encoder 105, the data format conversion processing may be executed by software processing. The image data conversion processing is not limited to the JPEG compression and the run-length compression, and any data conversion processing may be used. The image data can also be transferred without conversion.

The CPU 101 transmits the converted image data to the projector 200 through the network IF 106 (step S23). After the transmission of the image data, the CPU 101 checks whether there is an end instruction from the user (step S24) and ends the process if there is an end instruction. If there is no end instruction, the CPU 101 returns to step S21 and repeats the acquisition of image (step S21), the conversion (step S22), and the transmission (step S23) every time an image request signal transmitted from the projector 200 is received, until there is an end instruction from the user.

The image data transmitted by the transfer processing of step S23 is transmitted to the network IF 205 of the projector 200 through the communication network 300. The projector 200 that has received the image data through the network IF 205 uses the decoder 204 to decode the image data, transmits the decoded image data to the projection image control unit 207 through the internal bus 209, and projects the image through the projection unit 208. If the projector 200 does not include the decoder 204, the projector 200 may decode the image data by software processing.

According to the first embodiment, an image of an arbitrary area displayed on the display unit 111 of the PC 100 can be transferred without converting the resolution in the PC 100 and the projector 200 and can be displayed by the projector 200.

Accordingly, the load of image transfer processing can be reduced, and deterioration of an image due to image reduction processing can be prevented in a system which includes an image processing apparatus that transmits an image and a display apparatus that displays the transmitted image.

Second Embodiment

An operation according to a second embodiment of the image communication system will be described with reference to FIGS. 8 to 10. An area to be captured is arbitrarily designated on the screen in the first embodiment. The second embodiment describes a case in which the area to be captured is a specific window.

Figure 8:
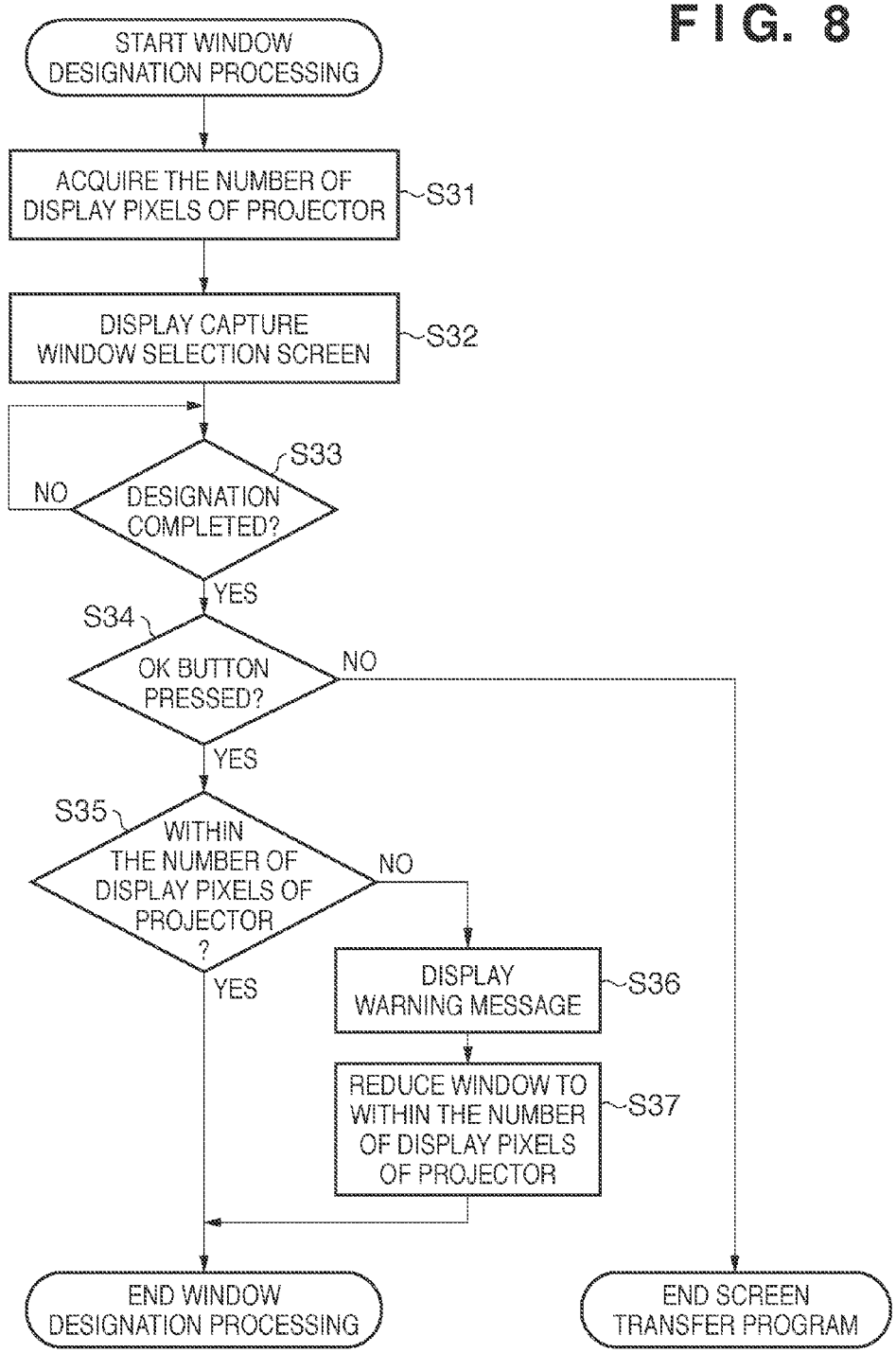
FIG. 8 is a flow chart of window designation processing by the PC according to a second embodiment.

Based on a command from the CPU 101, the PC 100 reads an image transfer program from the HDD 104 to start the window designation processing shown in FIG. 8. A flow of the window designation processing will be described with reference to FIG. 8. The CPU 101 controls the components of the PC 100 to execute the operation of the flow chart of FIG. 8 based on an application expanded in the RAM 103 of the PC 100.

When the window designation processing is started, the CPU 101 acquires the number of display pixels of the display area of the projector 200 through the network IF 106 (step S31). In response to the inquiry of the number of display pixels from the PC 100, the projector 200 reads out the number of display pixels of the projector 200 stored in advance in the ROM 202 and transmits the number of display pixels to the PC 100 through the network IF 205. The CPU 101 displays a capture window selection screen (step S32) and waits until the user completes the designation of the window (step S33).

Figure 9A:
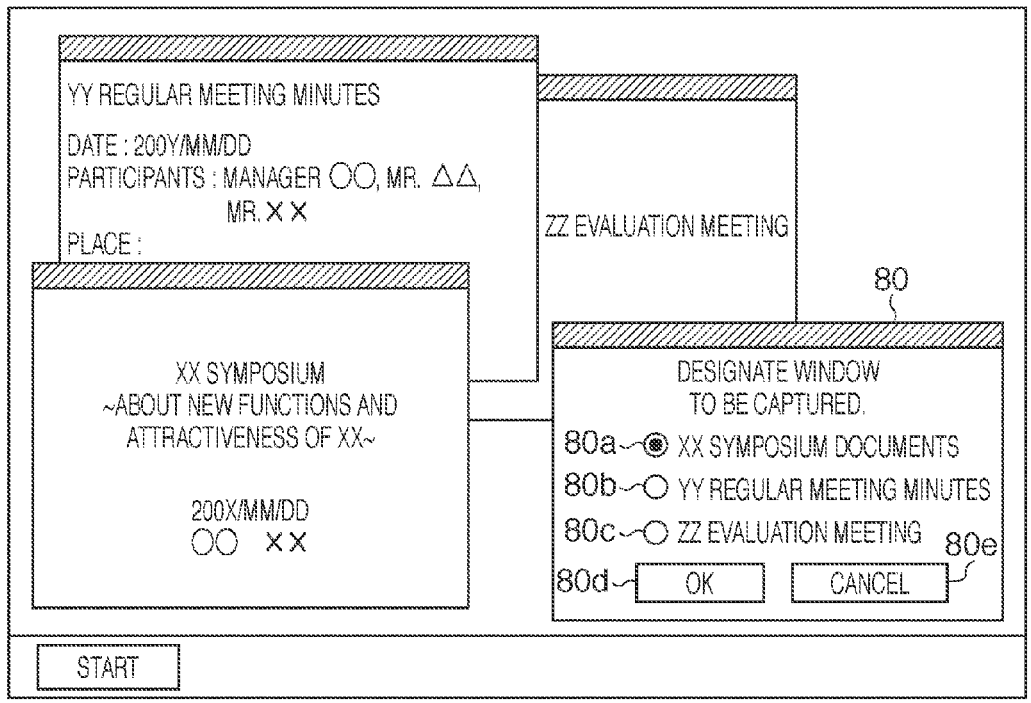
FIGS. 9A and 9B are diagrams showing examples of a window selection screen according to the second embodiment.
Figure 10:
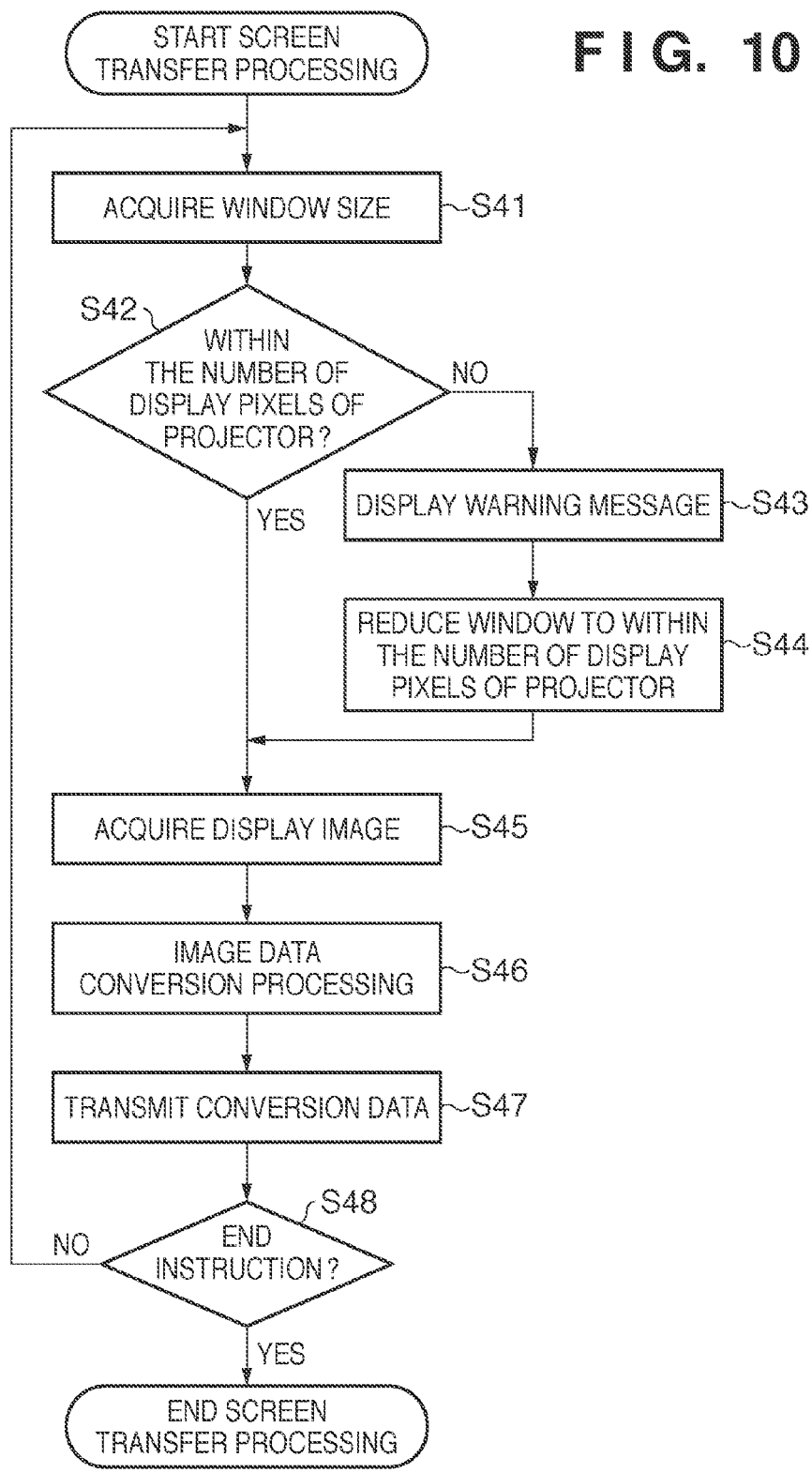
FIG. 10 is a flow chart of image transfer processing according to the second embodiment.

FIG. 9A shows display of a capture window selection window 80 as an example of the selection screen of the area to be captured. In the example shown in FIG. 9A, the CPU 101 displays three windows on the display unit 111. The user can use radio buttons 80a to 80c to operate the pointer to select one of the three windows currently displayed on the screen to select the window to be captured. Since there are three windows on the screen in the illustrated example, three windows exist in the list displayed on the capture window selection window 80. However, the content of the window list changes in accordance with the number or content of the windows displayed on the screen. Instead of displaying the selection screen, an active window may be designated as a capture window.

Figure 9B:
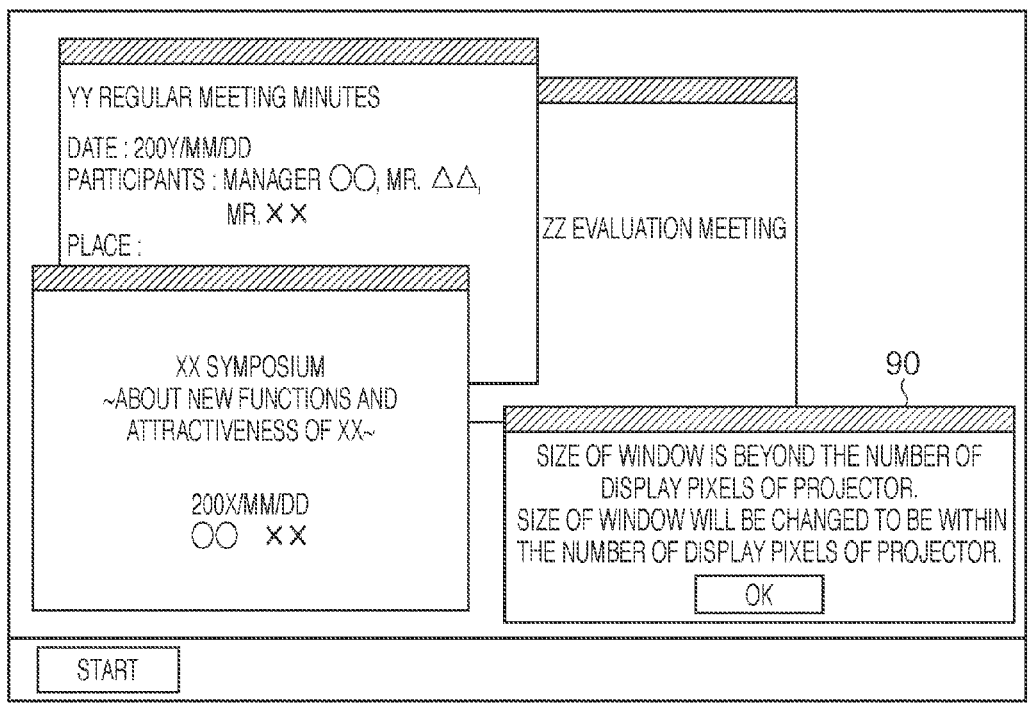

When the user selects a window and presses the OK button 80d with the pointer, the CPU 101 moves to the next flow (step S34). If the cancel button 80e is pressed instead of the OK button 80d, the CPU 101 ends the screen transfer program. If the OK button 80d is pressed, it is determined whether the number of pixels of the selected window is within the number of display pixels of the projector (step S35). If one or both of the number of horizontal pixels and the number of vertical pixels of the selected window are greater than the number of display pixels of the projector 200, the CPU 101 displays a warning message 90 as shown in FIG. 9B on the display unit 111 (step S36). When the warning message 90 is displayed, a screen that allows the user to select one of the "Yes" button and the "No" button may be displayed on the display unit 111 as shown in FIG. 6 of the first embodiment.

After the display of the warning message, the CPU 101 reduces the window to a size equal to or smaller than the number of display pixels of the projector 200 (step S37) and ends the window designation processing. The reduction processing is similar to the example of FIGS. 5A to 5C described in the first embodiment, and the size of the window is changed as shown in FIGS. 5A to 5C in the second embodiment. On the other hand, if it is determined that the size of the window is within the number of display pixels of the projector 200 in step S35, the window designation processing ends.

After the end of the window designation processing, a screen transfer processing is executed. The screen transfer processing will be described with reference to FIG. 10. As described above, the CPU 101 controls the components of the PC 100 to execute the operation of the flow chart of FIG. 10 based on an application expanded in the RAM 103 of the PC 100.

When the screen transfer processing is started, the CPU 101 executes the following operation every time an image request signal is received from the projector 200. The CPU 101 acquires the window size of the window to be captured (step S41). To acquire the window size, for example, a GetWindowRect function can be used to acquire information, such as the number of horizontal pixels and the number of vertical pixels of each Window, in the Windows (registered trademark) environment. The CPU 101 determines whether the acquired window size is within the number of display pixels of the projector 200 (step S42). The reason of the determination at this point is that the user may enlarge, reduce, maximize, or minimize the window while the screen is transferred.

If one or both of the number of horizontal pixels and the number of vertical pixels of the window are greater than the number of display pixels of the projector 200, the CPU 101 displays a warning message as shown in FIG. 9B on the display unit 111 (step S43). The CPU 101 then reduces the window to within the number of display pixels of the projector 200 (step S44). Although the reduction processing of the window is performed as in the example of FIGS. 5A to 5C described in the first embodiment, the size of the window is designated to change the size in the present embodiment.

The CPU 101 captures the image outputted to the display unit 111 and stores the image data of the captured image from the VRAM 108 to the RAM 103 through the driver (step S45). In this case, the CPU 101 acquires only the image of the designated window and stores the image in the RAM 103.

The CPU 101 uses the encoder 105 to convert the image data stored in the RAM 103 into a predetermined data format (step S46). As shown in the first embodiment, examples of the conversion into the predetermined data format include JPEG compression and run-length compression. As in the first embodiment, if the PC 100 does not include the encoder 105, the data format conversion processing may be executed by software processing.

The CPU 101 transmits the converted image data to the projector 200 through the network IF 106 (step S47). After the transmission of the image data, the CPU 101 checks whether there is an end instruction from the user (step S48), in which case it ends the process. If there is no end instruction, the process of steps S41 to S47 is repeated until there is an end instruction from the user, every time an image request signal transmitted from the projector 200 is received.

The size of the window is acquired every time, and the size is compared with the number of display pixels of the projector 200 in the description of the second embodiment. However, the present invention is not limited to this, and for example, the process of steps S42 to S44 may be executed only when the user enlarges, reduces, maximizes, or minimizes the window. This can be realized by, for example, using a SetWindowsHookEx function to hook the message in the Windows (registered trademark) environment.

As described, according to the second embodiment, an image of a specific area displayed on the display unit 111 of the PC 100 can be transferred without the resolution conversion in the PC 100 and the projector 200 and can be displayed by the projector 200.

In step S46, the CPU 101 reduces the size of the window to a size equal to or smaller than the number of display pixels of the projector 200. In this case, the CPU 101 may restore the size of the window when the communication with the projector 200 is terminated after the end of the image transfer processing. To execute such an operation, the CPU 101 stores the designated original window size in the RAM 103 when the size of the window is reduced to within the number of display pixels of the projector 200, and when the image transfer is finished or when the communication with the projector 200 is terminated, the CPU 101 reads out the window size stored in the RAM 103 and changes the window size again to the original size.

According to the process of the present embodiment, the window size is limited to within the number of display pixels of the projector 200 even if the window size is maximized.

Third Embodiment

An operation according to a third embodiment of the image communication system will be described with reference to FIGS. 11 and 12. The area to be captured is designated in the PC 100 (external image processing apparatus) in the first and second embodiments. The third embodiment describes a case in which the area to be captured is designated from the projector 200.

Figure 11:
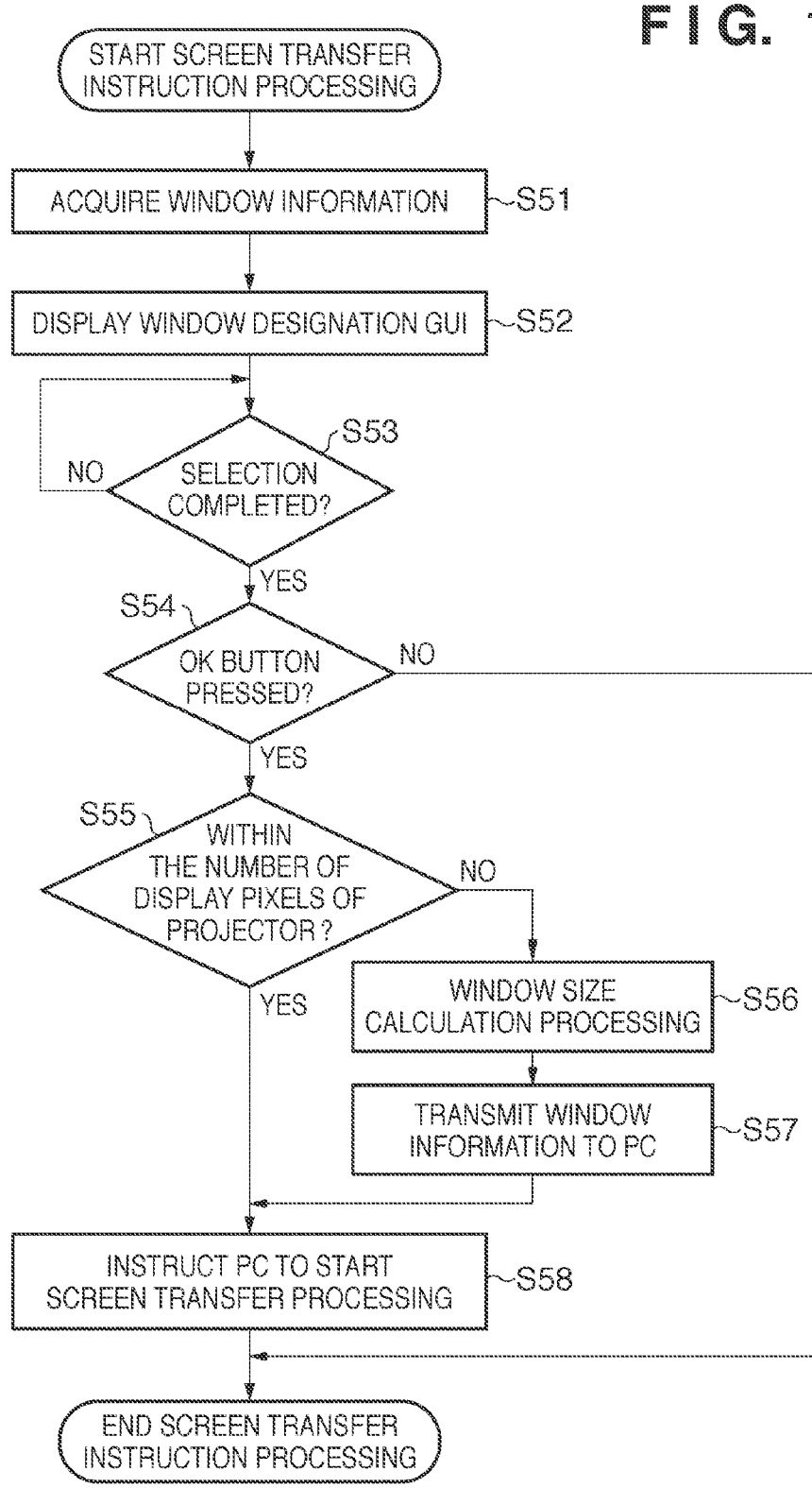
FIG. 11 is a flow chart of screen transfer instruction processing by the projector according to a third embodiment.

Based on a command from the CPU 201, the projector 200 reads a capture area designation program from the ROM 202 to start the screen transfer instruction processing shown in FIG. 11. A flow of the area designation processing will be described with reference to FIG. 11. It is assumed in the description that the screen transfer program as described in the first and second embodiments is launched in the PC 100 before the start of the area designation processing of FIG. 11 by the projector 200.

The projector 200 acquires information of a window (window information) currently displayed by the PC 100 from the PC 100 through the network IF 205 (step S51). The window information includes information such as the ID that can uniquely identify the window, the title of the window, and the number of horizontal pixels and the number of vertical pixels of the window. The window information is acquired by transmitting a window information acquisition request from the projector 200 to the screen transfer program of the PC 100, collecting the window information by the screen transfer program of the PC 100 that has received the request, and transmitting the information to the projector 200. As for the number of horizontal pixels and the number of vertical pixels, the method described in the second embodiment is used to acquire and collect the window information by the screen transfer program of the PC 100. The window title can be acquired using, for example, a GetWindowText function in the Windows (registered trademark) environment. The ID that allows the screen transfer program of the PC 100 to uniquely identify the window is added to the acquired number of horizontal pixels, number of vertical pixels, and window title, and transmitted to the projector 200 as the window information.

Figure 12:
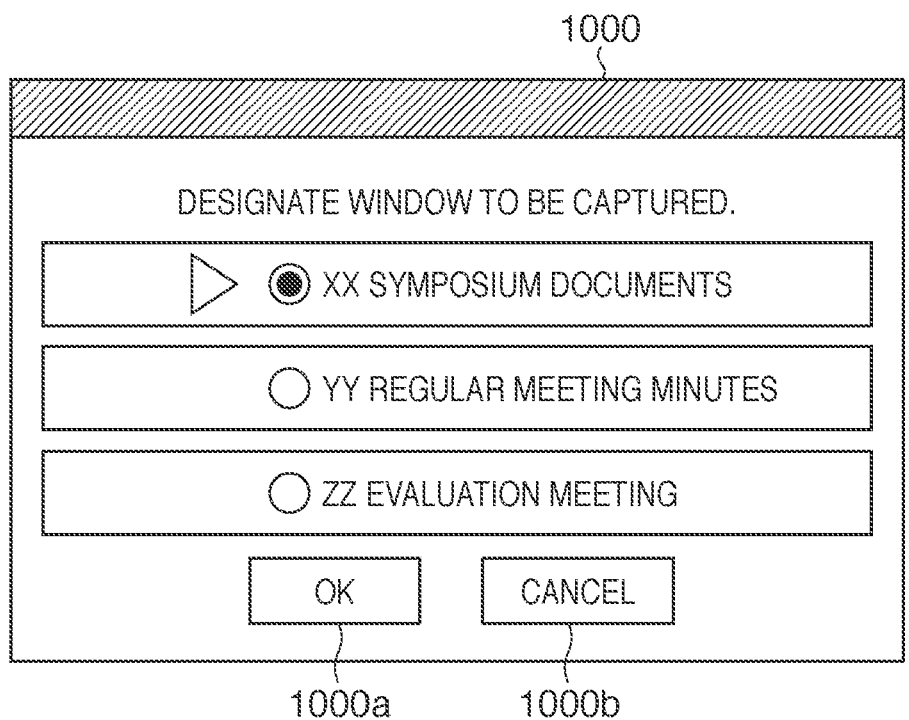
FIG. 12 is a diagram showing an example of a window selection screen according to the third embodiment.

After the acquisition of the window information, the projector 200 superimposes and displays a capture window selection window 1000 shown in FIG. 12 over the projected image (step S52). The user uses the operation key 206a or the remote controller 206c of the projector 200 to operate the capture window selection window 1000 to select the window to be captured. After the display of the capture window selection window 1000, whether the user has finished selecting the window to be captured is checked (step S53). Then, whether the user has pressed the OK button 1000a is checked (step S54). If the OK button 1000a is not pressed, but the cancel button 1000b is pressed, the process ends.

If the OK button 1000a is pressed, it is determined whether the window selected by the user is within the number of display pixels of the projector (step S55). The determination is performed by comparing the window information acquired in step S51 with the number of display pixels of the projector stored in the ROM 202. If one or both of the number of horizontal pixels and the number of vertical pixels of the selected window are not within the number of horizontal pixels and the number of vertical pixels of the projector, window size calculation processing is executed (step S56). In the window size calculation processing, the number of horizontal pixels and the number of vertical pixels of the window that does not fall within the number of display pixels of the projector 200 are calculated by the same method as in the example of FIGS. 5A to 5C described in the first embodiment. After the calculation of the window size, the window information including the information of the calculated number of horizontal pixels and number of vertical pixels of the window is transmitted to the screen transfer program of the PC 100 (step S57), and the process ends. The screen transfer program of the PC 100 receives the window information transmitted by the process of step S57, resizes the window to the size in accordance with the instruction of the projector, and starts the screen transfer processing (step S58).

As described above, according to the third embodiment, the image of the specific area displayed on the display unit 111 of the PC 100 can be transferred without converting the resolution in the PC 100 and the projector 200 and can be displayed by the projector 200.

Fourth Embodiment

An operation according to a fourth embodiment of the image communication system will be described with reference to FIG. 13. The system configuration of the fourth embodiment is the same as the first embodiment, and only the area designation processing described with reference to FIG. 3 in the first embodiment is different. Therefore, the area designation processing according to the fourth embodiment executed by the PC 100 will be described with reference to FIG. 13.

Figure 13:
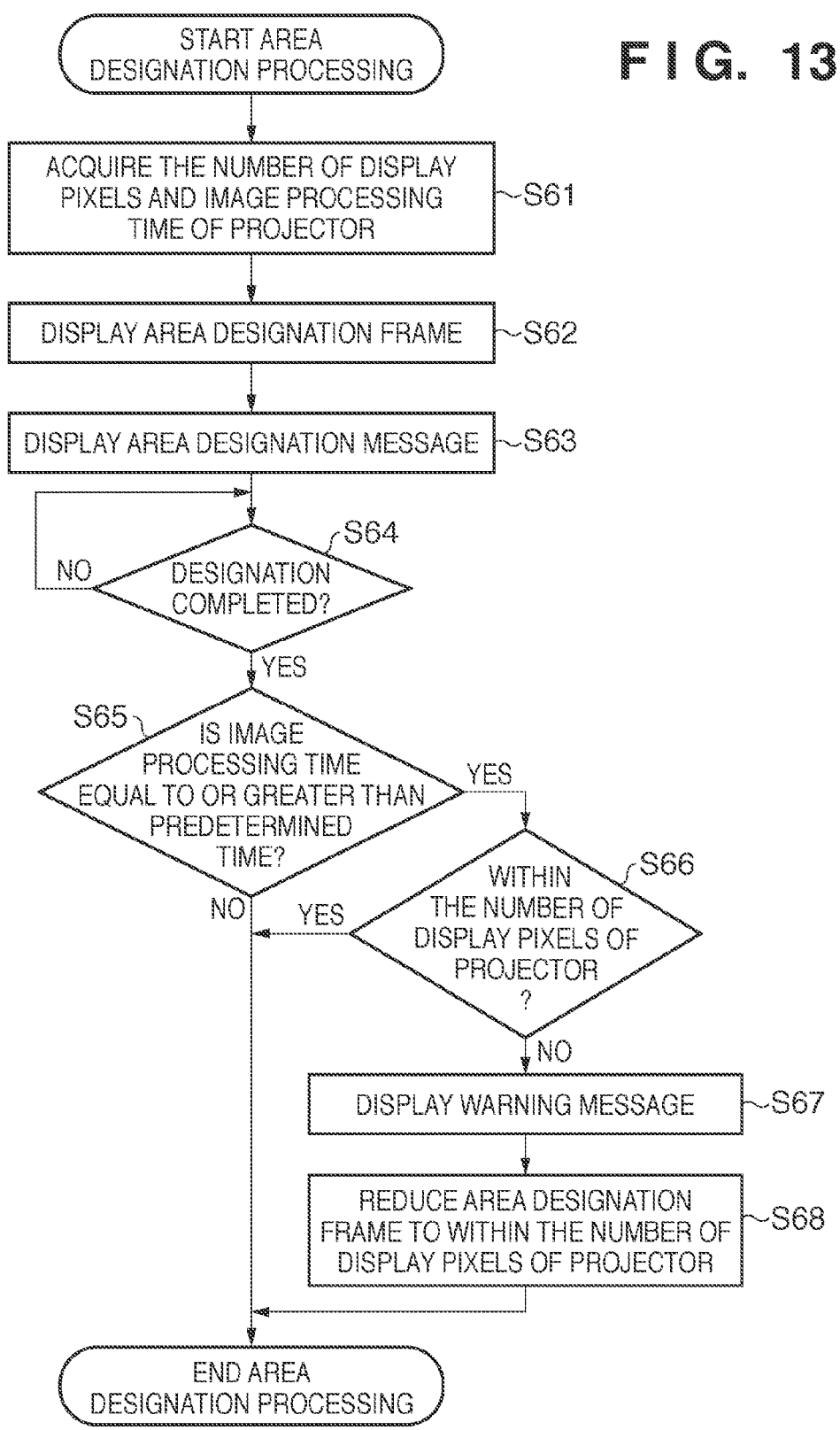
FIG. 13 is a flow chart of area designation processing by the PC according to a fourth embodiment.

The PC 100 reads an image transfer program from the HDD 104 based on a command from the CPU 101 to start area designation processing shown in FIG. 13.

When the area designation processing is started in PC 100, the CPU 101 acquires the number of display pixels and image processing time of the projector 200 through the network IF 106 (step S61). The image processing time of the projector 200 denotes time required for the projector 200 to decode and display an image of the same size as the number of display pixels of the projector 200.

In response to an inquiry of the image processing time from the PC 100, the CPU 201 of the projector 200 reads out the number of display pixels and the image processing time of the projector 200 stored in advance in the ROM 202 and transmits the number of display pixels and the image processing time to the PC 100 through the network IF 205. The CPU 101 displays, on the display unit 111, an area designation frame for designating an area for capturing the image (step S62) and displays a message for promoting area designation (step S63). The CPU 101 waits until the user completes the area designation (step S64). Steps S62 to S64 are the same processes as steps S12 to S14 of FIG. 3, and the description will not be repeated.

When the user completes the process of designation, the CPU 101 determines whether the image processing time of the projector obtained in step S61 is less than a predetermined time (step S65). The predetermined time in step S65 is set in advance to a predetermined value, such as 100 msec. When the value is predetermined, the value is recorded together with the image transfer program stored in the HDD 104, and the value is loaded at the same time when the image transfer program is loaded. Although the predetermined time is determined in advance in the present embodiment, the user may be able to change the time to an arbitrary value. If the processing time is determined to be within the predetermined time in step S65, the CPU 101 determines whether the size of the area designation frame is within the acquired number of display pixels of the projector 200 (step S66). If one or both of the number of horizontal pixels and the number of vertical pixels of the area designation frame are greater than the number of horizontal pixels and the number of vertical pixels of the projector 200, the CPU 101 displays a warning screen for the user on the display unit 111 (step S67). The area designation frame is reduced to within the number of display pixels of the projector (step S68), and the area designation processing ends.

Although only the image processing time of the projector is used for the determination of step S65 in the present embodiment, the determination of step S65 may be performed in consideration of the size of the area designation frame described in the first embodiment. More specifically, the time until the image in the size of the area designation frame designated by the user is processed is calculated based on the number of display pixels and the image processing time of the projector 200. The warning display of step S67 may be performed if the value is within the predetermined time, and the size of the designation frame may be reduced to within the size that makes the value smaller than the predetermined processing time.

The flow shown in FIG. 13 will be described more specifically using numerical values. It is assumed that the number of display pixels of the projector 200 obtained in step S61 is 1024×768, and the image processing time is 200 msec. It is also assumed that the size of the frame designated by the user is 1000×500. It is also assumed that the predetermined time that serves as the reference of the determination of step S65 is 100 msec. The processing time per pixel of the projector 200 can be calculated from the number of display pixels and the image processing time of the projector 200 obtained in step S61. The processing time per pixel is expressed by the following formula in the case of the above example.

$$200 \text{ msec}/(1024 \times 768) = 0.000254 \ldots$$

If the value calculated by the above formula is multiplied by the size of the frame designated by the user, the time necessary for the projector 200 to process the image of the area designated by the user can be calculated.

Since the size of the frame designated by the user is 1000×500 in the above example, the time necessary for the projector 200 to process the image of the area of the frame designated by the user can be calculated by the following formula.

$$0.000254 \ldots \times 1000 \times 500 = 127.15 \ldots$$

Compared to the reference value 100 msec of step S65, the value calculated by the above formula is greater than the reference value. Therefore, a warning is displayed to the user in step S67. The designation frame is then reduced in step S68. In this case, the designation frame is reduced to make the processing time shorter than the reference value 100 msec. The reduction processing of the area designation frame in step S68 is executed so that the image processing time becomes smaller than the reference value of step S65.

For example, the size of the area designation frame is reduced to a size of 800×400. The processing time when the size of the designation frame is 800×400 is 0.000254 . . . ×800×400=81.38 . . .

which is a value smaller than the reference value 100 msec of step S65. In the reduction processing of step S68, the designation frame may be reduced to any value as long as the image processing time becomes smaller than the reference value of step S65.

The image transfer processing after the area designation processing is the same process as in the first embodiment, and the description will not be repeated.

Although the area is designated in the PC 100 in the description above, the fourth embodiment can also be applied to the case in which the area is designated in the projector 200 as described in the third embodiment. In that case, the projector 200 can determine whether the image processing time in step S65 is equal to or greater than the predetermined time, and the projector 200 can control whether to execute the change processing of the number of horizontal pixels and the number of vertical pixels in accordance with the determination.

Fifth Embodiment

An operation of area designation processing according to a fifth embodiment of the image communication system will be described with reference to FIG. 14. The system configuration of the fifth embodiment is the same as in the first embodiment, and only the area designation processing described with reference to FIG. 3 in the first embodiment is different. Therefore, the area designation processing according to the fifth embodiment will be described with reference to FIG. 14.

Figure 14:
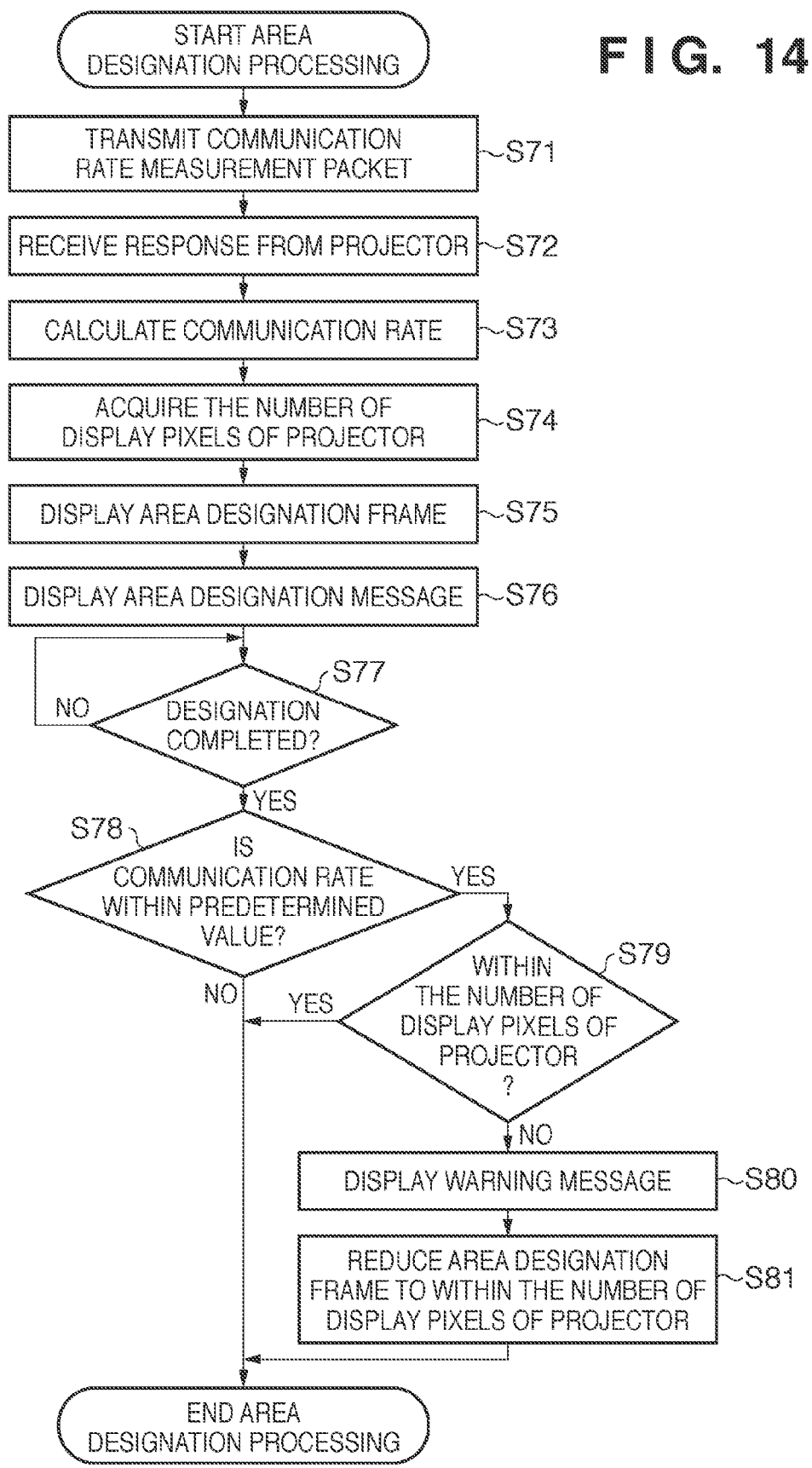
FIG. 14 is a flow chart of area designation processing by the PC according to a fifth embodiment.

The PC 100 reads an image transfer program from the HDD 104 based on a command from the CPU 101 to start the area designation processing shown in FIG. 14. When the area designation processing is started, a communication rate measurement packet is transmitted from the PC 100 to the projector 200 through the network IF 106 (step S71). The communication rate measurement packet is a packet in an arbitrary size for measuring the communication rate between the PC 100 and the projector 200, and the data included may be any data. The projector 200 that has received the communication rate measurement packet returns a packet of the same size to the PC 100 through the network IF 205.

The PC 100 receives a response from the projector (step S72). The PC 100 calculates the communication rate based on the time from the transmission of the communication rate measurement packet to the reception of the response of the projector and based on the size of the communication rate measurement packet (step S73).

The number of display pixels of the projector 200 is further acquired (step S74). An area designation frame for designating the area for capturing the image is displayed (step S75), and a message for promoting the area designation is displayed (step S76). The PC 100 waits until the user completes the area designation (step S77). The process in steps S74 to S77 is the same as the process in steps S11 to S14 of FIG. 3, and the detailed description will not be repeated.

When the process of designation is completed by the user, whether the communication rate obtained in step S73 is equal to or lower than a predetermined rate is determined (step S78). If the communication rate is equal to or lower than the predetermined rate, the CPU 101 determines whether the size of the area designation frame is within the acquired number of display pixels of the projector 200 (step S79). If one or both of the number of horizontal pixels and the number of vertical pixels of the area designation frame are greater than the number of horizontal pixels and the number of vertical pixels of the projector 200, the CPU 101 displays a warning screen for the user on the display unit 111 (step S80). The area designation frame is reduced to within the number of display pixels of the projector (step S81), and the area designation processing ends.

Although the area designation frame is reduced to within the number of display pixels of the projector when the communication rate is equal to or lower than the predetermined rate in the fifth embodiment, the size of the area designation frame to be reduced may be changed in proportion to the communication rate.

The image transfer processing after the area designation processing is the same process as in the first embodiment, and the description will not be repeated.

Although the area is designated in the PC 100 in the description above, the fifth embodiment can also be applied to the case in which the area is designated in the projector 200 as described in the third embodiment. In that case, the projector 200 can determine whether the communication rate in step S77 is equal to or lower than the predetermined value, and the projector 200 can control whether to execute the change processing of the number of horizontal pixels and the number of vertical pixels in accordance with the determination.

The first to fifth embodiments may be appropriately combined and used.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments for this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-164351, filed on Jul. 21, 2010, which is hereby incorporated by reference herein in its entirety.

What is claimed is:

1. An image transmission apparatus that transmits an image to an external image display apparatus through a communication unit, the image transmission apparatus comprising:
    a display unit;
    a designation unit that designates a part of a display area of said display unit;
    an acquisition unit that acquires a number of horizontal pixels and a number of vertical pixels of said external image display apparatus through said communication unit;
    an extraction unit that extracts an image of the part of the display area designated by said designation unit if a number of horizontal pixels and a number of vertical pixels of the part of the display area designated by said designation unit are smaller than the number of horizontal pixels and the number of vertical pixels of said external image display apparatus acquired by said acquisition unit respectively, and that extracts an image of an area smaller than the number of horizontal pixels and the number of vertical pixels of said external image display apparatus from the display area if at least one case among a case in which the number of horizontal pixels of the part of the display area designated by said designation unit is equal to or greater than the number of horizontal pixels of said external image display apparatus acquired by said acquisition unit and a case in which the number of vertical pixels of the part of the display area designated by said designation unit is equal to or greater than the number of vertical pixels of said external image display apparatus acquired by said acquisition unit is true; and
    a transmission unit that transmits the image extracted by said extraction unit to said external image display apparatus.

2. The image transmission apparatus according to claim 1, wherein
    said extraction unit extracts an image of an area smaller than the number of horizontal pixels and the number of vertical pixels of said external image display apparatus within the part of the display area designated by said designation unit if at least one case among a case in which the number of horizontal pixels of the part of the display area designated by said designation unit is greater than the number of horizontal pixels of said external image display apparatus acquired by said acquisition unit and a case in which if the number of vertical pixels of the part of the display area designated by said designation unit is greater than the number of vertical pixels of said external image display apparatus acquired by said acquisition unit is true.

3. The image transmission apparatus according to claim 1, wherein
    said designation unit changes a range of the part of the display area designated by said designation unit if at least one case among a case in which the number of horizontal pixels of the part of the display area designated by said designation unit is greater than the number of horizontal pixels of said external image display apparatus acquired by said acquisition unit and a case in which the number of vertical pixels of the part of the display area designated by said designation unit is greater than the number of vertical pixels of said external image display apparatus acquired by said acquisition unit is true.

4. The image transmission apparatus according to claim 1, wherein
    said acquisition unit further acquires an image processing time which is a time for decoding and displaying the image with the number of horizontal pixels of said external image display apparatus, and
    said extraction unit extracts the image of the area designated by said designation unit if the image processing time is shorter than a predetermined time.

5. The image transmission apparatus according to claim 1, wherein
    said acquisition unit further acquires a communication rate with said external image display apparatus, and
    said extraction unit extracts the image of the area designated by said designation unit if the communication rate acquired by said acquisition unit is higher than a predetermined rate.

6. An image transmission apparatus that transmits an image to an external image display apparatus through a communication unit, the image transmission apparatus comprising:
    a display unit;
    a designation unit that designates a part of a display area of said display unit;
    a number of pixels acquisition unit that acquires a number of horizontal pixels and a number of vertical pixels of said external image display apparatus through said communication unit;

an extraction unit that extracts an image of the part of the display area designated by said designation unit;

a transmission unit that transmits the image extracted by said extraction unit to said external image display apparatus; and a control unit that changes the area designated by said designation unit to an area smaller than the number of horizontal pixels and the number of vertical pixels of said external image display apparatus if at least one case among a case in which a number of horizontal pixels of part of the display area designated by said designation unit is greater than the number of horizontal pixels of said external image display apparatus acquired by said number of pixels acquisition unit and a case in which a number of vertical pixels of the part of the display area designated by said designation unit is greater than the number of vertical pixels of said external image display apparatus acquired by said number of pixels acquisition unit is true.

7. The image transmission apparatus according to claim 6, wherein said display unit displays a window as a graphical user interface of a window system, and said designation unit selects the window to designate the part of the display area.

8. The image transmission apparatus according to claim 7, wherein said control unit changes a size of the window designated by said designation unit to a size smaller than the number of horizontal pixels and the number of vertical pixels of said external image display apparatus if at least one case among a case in which a number of horizontal pixels of the window designated by said designation unit is greater than the number of horizontal pixels of said external image display apparatus acquired by said number of pixels acquisition unit and a case in which a number of vertical pixels of the window designated by said designation unit is greater than the number of vertical pixels of said external image display apparatus acquired by said number of pixels acquisition unit is true.

9. The image transmission apparatus according to claim 7, wherein said control unit controls a size of the window designated by said designation unit so that the size does not exceed the number of horizontal pixels and the number of vertical pixels of said external image display apparatus if at least one case among a case in which a number of horizontal pixels of the window designated by said designation unit is greater than the number of horizontal pixels of said external image display apparatus acquired by said number of pixels acquisition unit and a case in which a number of vertical pixels of the window designated by said designation unit is greater than the number of vertical pixels of said external image display apparatus acquired by said number of pixels acquisition unit is true.

10. An image display system comprising an image display apparatus and an image transmission apparatus, said image display apparatus comprising:

a first reception unit that receives an image transmitted from said image transmission apparatus;

a first display unit that displays the image received by said first reception unit;

an acquisition unit that acquires a number of horizontal pixels and a number of vertical pixels of a display area of said first display unit; and a first transmission unit that transmits the number of horizontal pixels and the number of vertical pixels of the display area of said first display unit acquired by said acquisition unit to said image transmission apparatus, said image transmission apparatus comprising:

a second display unit;

a designation unit that designates a part of a display area of said second display unit;

a second reception unit that receives the number of horizontal pixels and the number of vertical pixels of said image display apparatus through said communication unit;

an extraction unit that extracts an image of the part of the display area designated by said designation unit if a number of horizontal pixels and a number of vertical pixels of the part of the display area designated by said designation unit are smaller than the number of horizontal pixels and the number of vertical pixels of the display area of said first display unit received by said second reception unit respectively, and that extracts an image of an area smaller than the number of horizontal pixels and the number of vertical pixels of the display area of said first display unit from a display area of said second display unit if at least one case among a case in which the number of horizontal pixels of the part of the display area designated by said designation unit is equal to or greater than the number of horizontal pixels of the display area of said first display unit received by said second reception unit and a case in which the number of vertical pixels of the part of the display area designated by said designation unit is equal to or greater than the number of vertical pixels of the display area of said first display unit received by said second reception unit is true; and a second transmission unit that transmits the image extracted by said extraction unit to said image display apparatus.

11. An image display system comprising an image display apparatus and an image transmission apparatus, the image display apparatus comprising:

a first reception unit that receives an image transmitted from said image transmission apparatus;

a first display unit that displays the image received by said first reception unit;

an acquisition unit that acquires a number of horizontal pixels and a number of vertical pixels of a display area of said first display unit; and a first transmission unit that transmits the number of horizontal pixels and the number of vertical pixels of the display area of said first display unit acquired by said acquisition unit to said image transmission apparatus, said image transmission apparatus comprising:

a second display unit;

a designation unit that designates a part of a display area of said second display unit;

a second reception unit that receives the number of horizontal pixels and the number of vertical pixels of said image display apparatus through said communication unit;

an extraction unit that extracts an image of the part of the display area designated by said designation unit;

a second transmission unit that transmits the image extracted by said extraction unit to said image display apparatus; and a control unit that changes the area designated by said designation unit to an area smaller than the number of horizontal pixels and the number of vertical pixels of the display area of said first display unit if at least one case among a case in which a number of horizontal pixels of the part of the display area designated by said designation unit is greater than the number of horizontal pixels of the display area of said first display unit received by said second reception unit and a case in which a number of vertical pixels of the part of the display area designated by said designation unit is greater than the number of vertical pixels of the display area of said first display unit received by said second reception unit is true.

12. A control method of an image transmission apparatus that transmits an image to an external image display apparatus through a communication unit and that comprises a display unit, the control method comprising:

a designation step of designating a part of a display area of said display unit;

an acquisition step of acquiring a number of horizontal pixels and a number of vertical pixels of said external image display apparatus through said communication unit;

an extraction step of extracting an image of the part of the display area designated in said designation step if a number of horizontal pixels and a number of vertical pixels of the part of the display area designated in said designation step are smaller than the number of horizontal pixels and the number of vertical pixels of said external image display apparatus acquired in said acquisition step respectively, and extracting an image of an area smaller than the number of horizontal pixels and the number of vertical pixels of said external image display apparatus from the display area if at least one case among a case in which the number of horizontal pixels of the part of the display area designated in said designation step is equal to or greater than the number of horizontal pixels of said external image display apparatus acquired in said acquisition step and a case in which the number of vertical pixels of the part of the display area designated in said designation step is equal to or greater than the number of vertical pixels of said external image display apparatus acquired in said acquisition step is true; and a transmission step of transmitting the image extracted in said extraction step to said external image display apparatus.

13. A control method of an image transmission apparatus that transmits an image to an external image display apparatus through a communication unit and that comprises a display unit, the control method comprising:

a designation step of designating a part of a display area of said display unit;

a number of pixels acquisition step of acquiring a number of horizontal pixels and a number of vertical pixels of said external image display apparatus through said communication unit;

an extraction step of extracting an image of the part of the display area designated in said designation step;

a transmission step of transmitting the image extracted in said extraction step to said external image display apparatus; and a control step of changing the area designated in said designation step to an area smaller than the number of horizontal pixels and the number of vertical pixels of said external image display apparatus if at least one case among a case in which a number of horizontal pixels of the part of the display area designated in said designation step is greater than the number of horizontal pixels of said external image display apparatus acquired in said number of pixels acquisition step and a case in which a number of vertical pixels of the part of the display area designated in said designation step is greater than the number of vertical pixels of said external image display apparatus acquired in said number of pixels acquisition step is true.

* * * * *